(12) United States Patent
Babb et al.

(10) Patent No.: US 11,820,861 B2
(45) Date of Patent: Nov. 21, 2023

(54) POLYETHER POLYMERIZATION PROCESS

(71) Applicant: Dow Global Technologies LLC, Midland, MI (US)

(72) Inventors: David A. Babb, Lake Jackson, TX (US); Jean-Paul Masy, Destelbergen (BE); David Keith Steelman, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 250 days.

(21) Appl. No.: 17/413,978

(22) PCT Filed: Dec. 11, 2019

(86) PCT No.: PCT/US2019/065596
§ 371 (c)(1),
(2) Date: Jun. 15, 2021

(87) PCT Pub. No.: WO2020/131508
PCT Pub. Date: Jun. 25, 2020

(65) Prior Publication Data
US 2022/0041807 A1 Feb. 10, 2022

Related U.S. Application Data

(60) Provisional application No. 62/783,299, filed on Dec. 21, 2018.

(51) Int. Cl.
*C08G 65/26* (2006.01)
*B01J 31/02* (2006.01)
*B01J 35/00* (2006.01)
*B01J 31/04* (2006.01)

(52) U.S. Cl.
CPC ....... *C08G 65/2663* (2013.01); *B01J 31/0211* (2013.01); *B01J 31/0235* (2013.01); *B01J 31/04* (2013.01); *B01J 35/006* (2013.01); *C08G 65/2606* (2013.01)

(58) Field of Classification Search
None
See application file for complete search history.

(56) References Cited

U.S. PATENT DOCUMENTS 9,040,657 B2   5/2015   Laitar

FOREIGN PATENT DOCUMENTS

| CA | 2242957 A1 * | 7/1998 |
| EP | 0476780 A2 * | 9/1990 |
| WO | 2012/091968 A | 7/2012 |
| WO | 2018/209069 A | 11/2018 |
| WO | 2018/209075 A | 11/2018 |

OTHER PUBLICATIONS

Dienes et al., Green Chemistry 2012, 14, 1168.
Subhani et al., Eur. J. Inorganic Chem. 2016, 1944-1949.

* cited by examiner

*Primary Examiner* — Tae H Yoon

(57) ABSTRACT

Catalyst complexes include a zinc hexacyanocobaltate with $M^5$ metal and $M^6$ metal or semi-metal phases, wherein $M^5$ metal is gallium, hafnium, manganese, titanium and/or indium and the $M^6$ metal or semi-metal is one or more of aluminum, magnesium, manganese, scandium, molybdenum, cobalt, tungsten, iron, vanadium, tin, titanium, silicon and zinc and is different from the $M^5$ metal. The catalysts are highly efficient propylene oxide polymerization catalysts characterized by rapid activation, short times to the onset of rapid polymerization and high polymerization rates once rapid polymerization has begun.

12 Claims, 1 Drawing Sheet

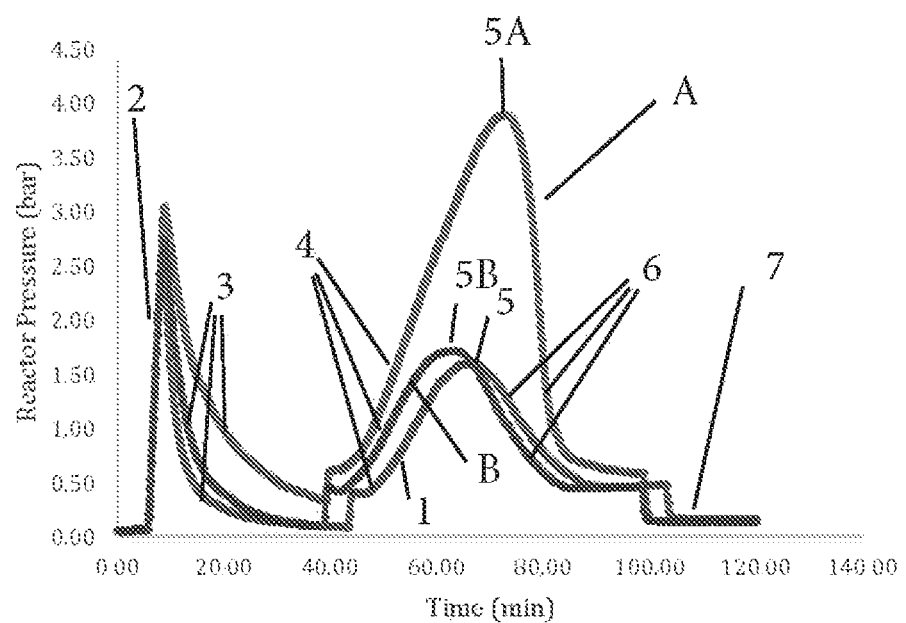

POLYETHER POLYMERIZATION PROCESS

CROSS-REFERENCE TO RELATED APPLICATION

This application is a § 371 of PCT/US2019/065596, filed Dec. 11, 2019, and claims benefit of US Provisional Patent Application No. 62/783,299, field Dec. 21, 2018.

This invention relates to processes for polymerizing alkylene oxides to form polyethers.

Poly(alkylene oxides) are produced globally in large quantities by polymerizing one or more alkylene oxides in the presence of a polymerization catalyst. They are important raw materials for producing polyurethanes and are used as surfactants and industrial solvents, among other uses. The predominant polymerization catalysts are alkali metal hydroxides or alkoxides and certain metal complexes that are commonly referred to as double metal cyanide (DMC) catalysts.

Double metal cyanide catalysts have certain advantages. They do not strongly catalyze a rearrangement of propylene oxide to form propenyl alcohol. Polyether polyols made using DMC catalysts therefore tend to have lower quantities of unwanted monofunctional polymers. In addition, DMC catalyst residues usually do not need to be removed from the product. Doing so avoids neutralization and catalyst removal steps that are needed when alkali metal catalysts are used.

DMC catalysts have certain disadvantages, however. They exhibit a latency period after being exposed to an alkylene oxide under polymerization conditions before they become "activated" and rapid polymerization begins. Another significant problem is that DMC catalysts perform sluggishly in the presence of high concentrations of hydroxyl groups. For this reason, DMC catalysts are disfavored when making low molecular weight products and in semi-batch processes that begin with low equivalent weight starters.

U.S. Pat. No. 9,040,657 discloses a method of producing a polyether monol or polyol in the presence of the DMC catalyst and a magnesium, Group 3-Group 15 metal or lanthanide series compound in which a magnesium, Group 3-Group 15 metal or lanthanide series metal is bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion, the magnesium, Group 3-Group 15 or lanthanide series metal compound being devoid of halide anions. This technology is very effective in reducing the activation time and in improving the catalyst performance when exposed to high concentrations of hydroxyl groups. However, adding the second component of the catalyst system into the polymerization reaction requires additional equipment for storing and metering. Because of the small amounts that are needed, precise control over the addition of the second component can be difficult.

Subhani et al., in *Eur. J. Inorg. Chem.*, 2016, 1944-1949, describe hybrid $TiO_2$-DMC hybrid catalysts and their use in copolymerizing propylene oxide and carbon dioxide to form polycarbonates. A hybrid $SiO_2$-DMC catalyst, also for polycarbonate production, is described by Dienes et al. in *Green Chem.* 2012, 14, 1168.

PCT/US2018/032045 and PCT/US2018/032051, both filed 10 May 2017, disclose catalyst compositions made by precipitating a catalyst in the presence of certain metal compounds, which may include gallium, hafnium, indium or aluminum compounds. The catalysts produced with gallium, hafnium and indium compounds perform extremely well, but the very high cost of these metals discourages industrial use of those catalysts. It would be desired to mimic or even improve upon the performance of the gallium-, hafnium- or indium-containing catalysts while reducing cost.

This invention is a catalyst complex selected from the group consisting of catalyst complexes I and II, wherein: catalyst complex I is corresponds to the formula:

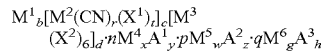

wherein:

$M^1$ and $M^4$ each represent a metal ion independently selected from $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$;

$M^2$ and $M^3$ each represent a metal ion independently selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh3+$, $Ru^{2+}$, $V^{4+}$, $V^{5+}$, $Ni^{2+}$, $Pd^{2+}$, and $Pt^{2+}$;

$M^5$ represents one or more of gallium, hafnium, manganese, titanium and indium;

$M^6$ represents one or more of aluminum, magnesium, manganese, scandium, molybdenum, cobalt, tungsten, iron, vanadium, tin, titanium, silicon and zinc and is different from $M^5$;

$X^1$ represents a group other than cyanide that coordinates with the $M^2$ ion;

$X^2$ represents a group other than cyanide that coordinates with the $M^3$ ion;

$A^1$ represents a halide, nitrate, sulfate, carbonate, cyanide, oxalate, thiocyanate, isocyanate, perchlorate, isothiocyanate, an alkanesulfonate, an arylenesulfonate, trifluoromethanesulfonate, or a $C_{1-4}$ carboxylate;

$A^2$ and $A^3$ each represents least one alkoxide, aryloxy, carboxylate, acyl, pyrophosphate, phosphate, thiophosphate, amide, oxide, siloxide, hydride, carbamate, halide or hydrocarbon anion;

b, c and d are each numbers that reflect an electrostatically neutral complex, provided that b and c each are greater than zero;

x and y are integers that balance the charges in the metal salt $M^4_x A^1_y$;

r is an integer from 4 to 6;

t is an integer from 0 to 2;

n is a number from 0 and 20;

p is a number from 0.001 to 10;

q is a number from 0.002 to 10;

p÷q=0.025 to 1.5;

w and z are numbers that balance the charges in the metal salt $M^5_w A^2_z$, provided that w is from 1 to 4; and g and h are numbers that balance the charges in the metal salt $M^6_g A^3_h$, provided that w is from 1 to 4;

and catalyst complex II is a mixture of a zinc hexacyanocobaltate catalyst, a particulate $M^5$ metal oxide wherein $M^5$ is selected from one or more of gallium, hafnium, manganese, titanium or indium and a particulate $M^6$ metal or semi-metal oxide wherein $M^6$ is selected from one or more of aluminum, magnesium, manganese, scandium, molybdenum, cobalt, tungsten, iron, vanadium, tin, titanium, silicon and zinc and is different from $M^5$, wherein the $M^5$ metal oxide is present in an amount that provides 0.001 to 10 moles of $M^5$ metal per mole of cobalt provided by the zinc hexacyanocobaltate catalyst and the $M^6$ metal or semi-metal oxide is present in an amount that provides 0.002 to 10 moles of $M^6$ metal or semi-metal per mole of cobalt provided by the zinc hexacyanocobaltate catalyst, and the mole ratio of $M^5$ metal to $M^6$ metal or semi-metal is 0.025 to 1.5.

The invention is also a method for producing a polyether, the method forming a reaction mixture comprising a hydroxyl-containing starter, at least one alkylene oxide and a catalyst complex of the invention, and polymerizing the alkylene oxide onto the hydroxyl-containing starter to produce the polyether in the presence of no more than 0.01 moles of a carbonate precursor per mole of alkylene oxide.

Surprisingly a combination of the $M^5$ and $M^6$ compounds leads to a catalyst performance that closely mimics that of the catalyst that contains the $M^5$ metal but not the $M^6$ metal or semi-metal, even when the amount of $M^5$ metal is sharply reduced. This permits the content of the $M^5$ metal to be reduced very substantially, which in such a case leads to a large decrease in cost while obtaining equivalent performance.

The FIGURE illustrates a graphical representation of reactor pressure vs. time for propylene oxide polymerizations using a catalyst of the invention and two comparative catalysts.

$M^1$ and $M^4$ each most preferably are zinc. $M^2$ and $M^3$ each most preferably are iron and cobalt, especially cobalt. $A^2$ and $A^3$ preferably are anions as described below with regard to the $M^5$ metal and $M^6$ metal and semi-metal compounds, respectively. R is most preferably 6 and t is most preferably zero. d is most preferably 0 to 1. The mole ratio of the $M^1$ metal and the $M^4$ metal combined to the $M^2$ and the $M^3$ metal combined is preferably 0.8:1 to 20:1.

In some embodiments p may be at least 0.001 at least 0.0025 and may be up to 10, up to 5, up to 1.5, up to 0.25 or up to 0.125. In some embodiments q may be at least 0.002, at least 0.01, at least 0.025 or at least 0.05 and may be up to 10, up to 2 up to 1.25 or up to 0.5. Smaller values of p and q do not lead to any improvement in the performance of the catalyst complex. Larger amounts not only fail to improve the catalyst performance but actually tend to diminish it.

In some embodiments, the ratio p+q may be at least 0.025 or at least 0.05 and up to 1.5, up to 1 or up to 0.5.

The values of p, q and the ratio p:q are conveniently determined using X-ray fluorescence (XRF) methods.

The foregoing formula is not intended to denote any special crystalline form or other spatial or chemical relationship between the $M^1{}_b[M^2(CN)_r(X^1)_t]_c[M^3(X^2)_6]_d$, $M^4{}_xA^1{}_y$, $M^5{}_wA^2{}_z$ and $M^6{}_gA^3{}_h$ components of the catalyst complex. In some embodiments the catalyst complex comprises hybrid particles having an $M^1{}_b[M^2(CN)_r(X^1)_t]_c$ phase, an $M^5$ metal oxide phase and an $M^6$ metal or semi-metal oxide phase; the $M^5$ metal oxide and $M^6$ metal or semi-metal oxide phases may be mixed. The $M^4{}_xA^1{}_y$ phase, when present, is believed to reside at least partially on particles of the $M^1{}_b[M^2(CN)_r(X^1)_t]_c$ phase. In addition to such hybrid particles, the catalyst complex may contain particles of the $M^1{}_b[M^2(CN)_r(X^1)_t]_c$ phase or of a $M^1{}_b[M^2(CN)_r(X^1)_t]_c[M^3(X^2)_6]_d\cdot nM^4{}_xA^1{}_y$ phase only, and other particles of the $M^4{}_xA^1{}_y$ phase only.

Catalyst complexes of the foregoing formula can be made in a precipitation process in which a solution containing the starting materials, including a cyanometallate compound and a starting $M^1$ compound is prepared, certain of the starting materials react and the catalyst complex precipitates from the starting solution. In general, methods for producing DMC catalysts as described, e.g., in U.S. Pat. Nos. 3,278,457, 3,278,458, 3,278,459, 3,404,109, 3,427,256, 3,427,334, 3,427,335, and 5,470,813, can be adapted to make the catalyst complex of this invention by incorporating the $M^5$ metal and $M^6$ metal or semi-metal compounds into the starting solutions used to prepare those catalysts.

The solvent includes at least one of water and a liquid aliphatic alcohol. The solvent is one in which the starting cyanometallate compound and $M^1$ metal compound are soluble. The solvent may or may not be a solvent for the $M^5$ metal and/or $M^6$ metal or semi-metal compounds.

The solvent may be, for example, water, n-propanol, iso-propanol, n-butanol, sec-butanol, t-butanol, other alkylene monoalcohol having up to, for example, 12 carbon atoms, ethylene glycol, diethylene glycol, triethylene glycol, propylene glycol, dipropylene glycol, tripropylene glycol, or other polyether having one or more hydroxyl groups and a molecular weight of up to, for example, 8000 g/mol. Aliphatic monoalcohols having 3 to 6 carbon atoms, especially t-butanol, are preferred among these. Especially preferred is a mixture of water and a liquid aliphatic alcohol that is soluble in water at the relative proportions present in the mixture (especially an aliphatic monoalcohol having 3 to 6 carbon atoms and most preferably t-butanol), in a volume ratio of 25:75 to 90:10.

The $M^1$ metal compound preferably is water-soluble. It is typically a salt of an $M^1$ metal and one or more anions. Such a salt may have the formula $M^1{}_xA^1{}_y$, wherein x, A1 and y are as described before. Suitable anions A1 include, but are not limited to, halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. In exemplary embodiments, the anion $A^1$ is not any of alkoxide, aryloxy, carboxylate, acyl, pyrophosphate, phosphate, thiophosphate, dithiophosphate, phosphate ester, thiophosphate ester, amide, oxide, siloxide, hydride, carbamate or hydrocarbon anion. The $M^1$ metal is one or more of $Zn^{2+}$, $F^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$. $Zn^{2+}$ is the preferred $M^1$ metal. $ZnCl_2$ is a preferred $M^1$ metal compound.

The cyanometallate compound includes an $M^2(CN)_r(X^1)_t$ anion, where r, $X^1$ and t are as described before. r is preferably 6 and t is preferably zero. The $M^2$ metal is one or more of $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh3+$, $Ru^{2+}$, $V^{4+}$, $V^{5+}$, $Ni^{2+}$, $Pd^{2+}$, and $Pt^{2+}$. The $M^2$ metal preferably is $Fe^{3+}$ or $Co^{3+}$, with $Co^{3+}$ being especially preferred. The cyanometallate compound preferably is an alkali metal or ammonium salt, although the corresponding cyanometallitic acid can be used. Potassium hexacyanocobaltate is a particularly preferred cyanometallate compound.

The starting solution is conveniently formed by forming separate solutions of the starting cyanometallate compound and the $M^1$ metal compound and combining them. The $M^5$ metal and $M^6$ metal or semi-metal compounds are conveniently added to one or the other of these separate solutions, preferably the $M^1$ metal or semi-metal compound solution. The combining of the starting solution should be accompanied by mixing. It is generally preferred to mix the cyanometallate compound solution into the solution of the $M^1$ metal compound, preferably by gradually adding the cyanometallate compound solution so the $M^1$ metal compound is always present in excess.

It is preferred to provide an excess of the $M^1$ metal compound over the cyanometallate compound. In some embodiments, the mole ratio of $M^1$ metal compound to cyanometallate compound is at least 2:1, preferably at least 3:1 or at least 5:1. This ratio may be, for example, up to 20:1 or up to 15:1.

The starting solution contains, prior to reaction, at least one $M^5$ metal compound and at least one $M^6$ metal or semi-metal compound in amounts as described before with respect to catalyst complex I. Suitable $M^5$ metal compounds $M^6$ metal or semi-metal compounds are described more fully below.

The cyanometallate compound and $M^1$ metal compound react to form a catalyst complex that includes a water-insoluble $M^1$ metal cyanometallate. This reaction proceeds spontaneously at temperatures around room temperature (23° C.) or slightly elevated temperatures. Therefore, no special reaction conditions are needed. The temperature may be, for example, from 0 to 60° C. A preferred temperature is 20 to 50° C. or 25 to 45° C. It is preferred to continue agitation until precipitation takes place, which is generally indicated by a change of appearance in the solution. The reaction pressure is not especially critical so long as the solvent does not boil off. A pressure of 10 to 10,000 kPa is suitable, with a pressure of 50 to 250 kPa being entirely suitable. The reaction time may be from 30 minutes to 24 hours or more.

In some cases, the $M^5$ metal and/or $M^6$ metal or semi-metal compounds may react during the catalyst preparation step. For example, the $M^5$ metal and/or $M^6$ metal or semi-metal compounds may react with water during the catalyst preparation to form the corresponding metal oxide. The $M^5$ metal and $M^6$ metal or semi-metal compounds or reaction product thereof (especially an $M^5$ metal oxide and/or and $M^6$ metal or semi-metal oxide) in some embodiments forms, together with a reaction product of the $M^1$ metal compound and the cyanometallate compound, hybrid particles having an $M^1{}_b[M^2(CN)_p(X^1)_r]_c$ phase, an $M^5$ metal oxide phase and an $M^6$ metal or semi-metal oxide phase. The $M^5$ metal oxide and $M^6$ metal or semi-metal oxide phases may be mixed or each may present a separate phase, or both.

It is preferred to treat the precipitated catalyst with a complexing agent. This is conveniently done by washing the precipitated catalyst one or more times with a complexing agent or solution of the complexing agent in water. The complexing agent component may include at least one of an alcohol as described before with regard to the starting solution, a polyether, a polyester, a polycarbonate, a glycidyl ether, a glycoside, a polyhydric alcohol carboxylate, a polyalkylene glycol sorbitan ester, a bile acid or salt, a carboxylic acid ester or amide thereof, cyclodextrin, an organic phosphate, a phosphite, a phosphonate, a phosphonite, a phosphinate, a phosphinite, an ionic surface- or interface-active compound, and/or an α,β-unsaturated carboxylic acid ester. In exemplary embodiments, the organic complex agent is one or more of n-propanol, iso-propanol, n-butanol, sec-butanol, t-butanol, other alkylene monoalcohol having up to 12 carbon atoms, ethylene glycol, diethylene glycol, triethylene glycol, propylene glycol, dipropylene glycol, tripropylene glycol, or other polyether having one or more hydroxyl groups and a molecular weight of up to, for example, 8000 g/mol.

The catalyst complex so made is conveniently recovered from the starting solution or any wash liquid, dried and, if desired, ground or milled to reduce the catalyst complex to a powder having a volume average particle size of, for example, 100 μm or smaller. Drying can be performed by heating and/or applying vacuum.

The $M^5$ metal and $M^6$ metal or semi-metal compounds take the forms $M^5{}_wA^2{}_z$ and $M^6{}_gA^3{}_h$, respectively, wherein $A^2$, $A^3$, w, z, g and h are as defined before. The anions $A^2$ and $A^3$ may be, for example, one or more of alkoxide, aryloxy, carboxylate, acyl, pyrophosphate, phosphate, thiophosphate, dithiophosphate, phosphate ester, thiophosphate ester, amide, oxide, siloxide, hydride, carbamate, halide and/or hydrocarbon anion. Exemplary embodiments include the oxide, hydrocarbyl, oxide and/or the alkoxide ions. In preferred embodiments, the anion is not a halide anion or a cyanide anion.

The $M^5$ metal and/or $M^6$ metal or metal oxide compounds may be insoluble in the solvent or, if soluble, may react during the preparation of the catalyst complex to form an insoluble reaction product that becomes part of the catalyst complex.

By "alkoxide" ion it is meant a species having the form —O—R, where R is an alkyl group or substituted alkyl group, and which is the conjugate base, after removal of a hydroxyl hydrogen, of an alcohol compound having the form HO—R. These alcohols may have pKa values in the range of 13 to 25 or greater. The alkoxide ion in some embodiments may contain from 1 to 20 (e.g., from 1 to 6 and/or from 2 to 6) carbon atoms. The alkyl group or substituted alkyl group may be linear, branched, and/or cyclic. Examples of suitable substituents include, e.g., additional hydroxyl groups (which may be in the alkoxide form), ether groups, carbonyl groups, ester groups, urethane groups, carbonate groups, silyl groups, aromatic groups such as phenyl and alkyl-substituted phenyl, and halogens. Examples of such alkoxide ions include methoxide, ethoxide, isopropoxide, n-propoxide, n-butoxide, sec-butoxide, t-butoxide, and benzyloxy. The R group may contain one or more hydroxyl groups and/or may contain one or more ether linkages. An alkoxide ion may correspond to the residue (after removal of one or more hydroxyl hydrogens) of an starter compound that is present in the polymerization, such as those starter compounds described below. The alkoxide ion may be an alkoxide formed by removing one or more hydroxyl hydrogens from a polyether monol or polyether polyol; such an alkoxide in some embodiments corresponds to a residue, after removal of one or more hydroxyl hydrogen atoms, of the polyether monol or polyether polyol product that is obtained from the alkoxylation reaction, or of a polyether having a molecular weight intermediate to that of the starter compound and the product of the alkoxylation reaction.

By "aryloxy" anion it is meant a species having the form —O—Ar, where Ar is an aromatic group or substituted group, and which corresponds, after removal of a hydroxyl hydrogen, to a phenolic compound having the form HO—Ar. These phenolic compounds may have a pKa of, e.g., from about 9 to about 12. Examples of such aryloxy anions include phenoxide and ring-substituted phenoxides, wherein the ring-substituents include, e.g., one or more of alkyl, CF3, cyano, COCH$_3$, halogen, hydroxyl, and alkoxyl. The ring-substituent(s), if present, may be in one or more of the ortho-, para- and/or meta-positions relative to the phenolic group. The phenoxide anions also include the conjugate bases of polyphenolic compounds such as bisphenol A, bisphenol F and various other bisphenols, 1,1,1-tris(hydroxyphenyl)ethane, and fused ring aromatics such as 1-naphthol.

By "carboxylate" anion it is meant a carboxylate that contains from 1 to 24 (e.g., from 2 to 18 and/or from 2 to 12) carbon atoms. The carboxylate may be aliphatic or aromatic. An aliphatic carboxylic acid may contain substituent groups. Examples of such include hydroxyl groups (which may be in the alkoxide form), ether groups, carbonyl groups, ester groups, urethane groups, carbonate groups, silyl groups, aromatic groups such as phenyl and alkyl-substituted phenyl, and halogens. Examples of aliphatic carboxylate anions include formate, acetate, propionate, butyrate, 2-ethylhexanoate, n-octoate, decanoate, laurate and other alkanoates and halogen-substituted alkanoates such as 2,2,2-trifluoroacetate, 2-fluoroacetate, 2,2-difluoroacetate, 2-chloroacetate, and 2,2,2-trichloroacetate. Examples of aromatic carboxylates include benzoate, alkyl-substituted benzoate, halo-substituted benzoate, 4-cyanobenzoate, 4-trifluoromethylbenzoate, salicylate, 3,5-di-t-butylsalicylate, and subsalicylate. In some embodiments, such a carboxylate ion may be the conjugate base of a carboxylic acid having a pKa from 1 to 6 (e.g., from 3 to 5).

By "acyl" anion it is meant a conjugate base of a compound containing a carbonyl group including, e.g., an aldehyde, ketone, acetylacetonate, carbonate, ester or similar compound that has an enol form. Examples of these are β-diketo compounds, such as acetoacetonate and butylacetoacetonate.

By "phosphate" anion it is meant a phosphate anion that have the formula —O—P(O)(OR$_1$)$_2$, wherein R$_1$ is alkyl, substituted alkyl, phenyl, or substituted phenyl. By "thiophosphate" anion it is meant thiophosphate anions have the corresponding structure in which one or more of the oxygens are replaced with sulfur. The phosphate and thiophosphates may be ester anions, such as phosphate ester and thiophosphate ester.

By "pyrophosphate" anion it is meant the $P_2O_7^{4-}$ anion.

By "amide" anion it is meant an ion in which a nitrogen atom bears a negative charge. The amide ion generally takes the form —N(R$_2$)$_2$, wherein the R$_2$ groups are independently hydrogen, alkyl, aryl, trialkylsilyl, or triarylsilyl. The alkyl groups may be linear, branched, or cyclic. Any of these groups may contain substituents such as ether or hydroxyl. The two R$_2$ groups may together form a ring structure, which ring structure may be unsaturated and/or contain one or more heteroatoms (in addition to the amide nitrogen) in the ring.

By "oxide" anion is meant the anion of atomic oxygen, i.e., $O^{2-}$.

By "siloxide" anion it is meant silanoates having the formula (R$_3$)$_3$SiO—, wherein R$_3$ groups are independently hydrogen or alkyl group.

By "hydride" anion it is meant the anion of hydrogen, i.e., H—

By "carbamate" anion it is meant the anion —OOCNH$_2$.

By "hydrocarbon" anion it is meant hydrocarbyl anions that include aliphatic, cycloaliphatic and/or aromatic anions wherein the negative charge resides on a carbon atom. The hydrocarbyl anions are conjugate bases of hydrocarbons that typically have pKa values in excess of 30. The hydrocarbyl anions may also contain inert substituents. Of the aromatic hydrocarbyl anions, phenyl groups and substituted phenyl groups may be used. Aliphatic hydrocarbyl anions may be alkyl groups, e.g., which contain from 1 to 12 (e.g., from 2 to 8) carbon atoms. For example, methyl, ethyl, n-propyl, isopropyl, n-butyl, sec-butyl, isobutyl, cyclopentadienyl and t-butyl anions are all useful.

By "halide" anion it is meant F$^-$, Cl$^-$, Br$^-$ and I$^-$;

Examples of useful gallium compounds include trialkyl gallium compounds such as trimethylgallium, triethyl gallium, tributyl gallium, tribenzylgallium and the like; gallium oxide; gallium alkoxides such as gallium trimethoxide, gallium triethoxide, gallium triisopropoxide, gallium tri-t-butoxide, gallium tri-sec-butoxide and the like; gallium aryloxides such as gallium phenoxide and gallium phenoxides in which one or more of the phenoxide groups is ring-substituted with one or more of alkyl, CF$_3$, cyano, COCH$_3$, halogen, hydroxyl, alkoxyl and the like; gallium carboxylates such as gallium formate, gallium acetate, gallium propionate, gallium 2-ethylhexanoate, gallium benzoate, gallium benzoates in which one or more of the benzoate groups is ring-substituted with one or more of alkyl, CF$_3$, cyano, COCH$_3$, halogen, hydroxyl, alkoxyl and the like, gallium salicylate, gallium 3,5-di-t-butyl salicylate; gallium amides such as gallium tris(dimethylamide), gallium tris (diethylamide), gallium tris(diphenylamide), gallium tris(di (trimethylsilyl)amide) and the like; gallium acetylacetonate; gallium t-butylacetylacetonate; and alkylgallium alkoxides such as diethylgallium ethoxide, dimethylgallium ethoxide, diethylgallium isopropoxide and dimethylgallium isopropoxide.

Examples of useful hafnium compounds include hafnium alkyls such as such as tetraethyl hafnium, tetrabutyl hafnium, tetrabenzyl hafnium and the like; hafnium oxide; hafnium alkoxides such as hafnium tetramethoxide, hafnium tetraethoxide, hafnium tetraisopropoxide, hafnium tetra-t-butoxide, hafnium tetra-sec-butoxide and the like; hafnium aryloxides such as hafnium phenoxide and hafnium phenoxides in which one or more of the phenoxide groups is ring-substituted with one or more of alkyl, CF$_3$, cyano, COCH$_3$, halogen, hydroxyl, alkoxyl and the like; hafnium carboxylates such as hafnium formate, hafnium acetate, hafnium propionate, hafnium 2-ethylhexanoate, hafnium benzoate, hafnium benzoates in which one or more of the benzoate groups is ring-substituted with one or more of alkyl, CF$_3$, cyano, COCH$_3$, halogen, hydroxyl, alkoxyl and the like, hafnium salicylate, hafnium 3,5-di-t-butyl salicylate; hafnium amides such as hafnium tetra(dimethylamide), hafnium tetra(diethylamide), hafnium tetra(diphenylamide), hafnium tetra((bistrimethylsilyl)amide); hafnium acetylacetonate and hafnium t-butylacetylacetonate.

Examples of useful indium compounds include trialkyl indium compounds like trimethyl indium; indium oxide; indium alkoxides such as indium methoxide, indium ethoxide, indium isopropoxide, indium t-butoxide, indium sec-butoxide and the like; indium aryloxides such as indium phenoxide and indium phenoxides in which one or more of the phenoxide groups is ring-substituted with one or more of alkyl, CF$_3$, cyano, COCH$_3$, halogen, hydroxyl, alkoxyl and the like; indium carboxylates such as indium formate, indium acetate, indium propionate, indium 2-ethylhexanoate, indium benzoate, indium benzoates in which one or more of the benzoate groups is ring-substituted with one or more of alkyl, CF$_3$, cyano, COCH$_3$, halogen, hydroxyl, alkoxyl and the like, indium salicylate, indium 3,5-di-t-butyl salicylate; indium acetylacetonate; and indium t-butylacetylacetonate.

Examples of useful aluminum compounds include trialkyl aluminum compounds such as trimethylaluminum, triethyl aluminum, tributyl aluminum, tribenzylaluminum and the like; aluminum alkoxides such as aluminum trimethoxide, aluminum triethoxide, aluminum triisopropoxide, aluminum tri-t-butoxide, aluminum tri-sec-butoxide and the like; aluminum aryloxides such as aluminum phenoxide and aluminum phenoxides in which one or more of the phenoxide groups is ring-substituted with one or more of alkyl, CF$_3$, cyano, COCH$_3$, halogen, hydroxyl, alkoxyl and the like; aluminum oxide; aluminum carboxylates such as aluminum formate, aluminum acetate, aluminum propionate, aluminum 2-ethylhexanoate, aluminum benzoate, aluminum benzoates in which one or more of the benzoate groups is ring-substituted with one or more of alkyl, CF$_3$, cyano, COCH$_3$, halogen, hydroxyl, alkoxyl and the like, aluminum salicylate, aluminum 3,5-di-t-butyl salicylate; aluminum amides such as aluminum tris(dimethylamide), aluminum tris(diethylamide), aluminum tris(diphenylamide), aluminum tris(di(trimethylsilyl)amide) and the like; aluminum acetylacetonate; aluminum t-butylacetylacetonate; and alkylaluminum oxides and alkoxides such as diethylaluminum ethoxide, dimethylaluminum ethoxide, diethylaluminum isopropoxide, dimethylaluminum isopropoxide, methyl aluminoxane, tetraethyldialuminoxane and the like.

Examples of useful magnesium compounds include magnesium alkyls such as diethyl magnesium, dibutyl magnesium, butylethyl magnesium, dibenzyl magnesium and the like; magnesium alkoxides such as magnesium methoxide, magnesium ethoxide, magnesium isopropoxide, magnesium t-butoxide, magnesium sec-butoxide and the like; magnesium aryloxides such as magnesium phenoxide, and magnesium phenoxides in which one or more of the phenoxide groups is ring-substituted with one or more of alkyl, $CF_3$, cyano, $COCH_3$, halogen, hydroxyl, alkoxyl and the like; magnesium carboxylates such as magnesium formate, magnesium acetate, magnesium propionate, magnesium 2-ethylhexanoate, magnesium benzoate, magnesium benzoates in which one or more of the benzoate groups is ring-substituted with one or more of alkyl, $CF_3$, cyano, $COCH_3$, halogen, hydroxyl, alkoxyl and the like, magnesium salicylate, magnesium 3,5-di-t-butyl salicylate; magnesium amides such as magnesium dimethylamide, magnesium diethylamide, magnesium diphenylamide, magnesium bis(trimethylsilyl)amide and the like; magnesium oxide, magnesium acetylacetonate and magnesium t-butylacetylacetonate Examples of useful manganese compounds include Mn(II) and/or Mn(III) and/or Mn(IV) compounds include manganese phosphate; pyrophosphate, manganese oxide; manganese alkoxides such as manganese methoxide, manganese ethoxide, manganese isopropoxide, manganese t-butoxide, manganese sec-butoxide and the like; manganese aryloxides such as manganese phenoxide and manganese phenoxides in which one or more of the phenoxide groups is ring-substituted with one or more of alkyl, $CF_3$, cyano, $COCH_3$, halogen, hydroxyl, alkoxyl and the like; manganese carboxylates such as manganese formate, manganese acetate, manganese propionate, manganese 2-ethylhexanoate, manganese benzoate, manganese benzoates in which one or more of the benzoate groups is ring-substituted with one or more of alkyl, $CF_3$, cyano, $COCH_3$, halogen, hydroxyl, alkoxyl and the like, manganese salicylate, manganese 3,5-di-t-butyl salicylate; manganese acetylacetonate; and manganese t-butylacetylacetonate.

Examples of useful scandium compounds include scandium alkoxides such as scandium methoxide, scandium ethoxide, scandium isopropoxide, scandium t-butoxide, scandium sec-butoxide and the like; scandium oxide; scandium aryloxides such as scandium phenoxide and scandium phenoxides in which one or more of the phenoxide groups is ring-substituted with one or more of alkyl, $CF_3$, cyano, $COCH_3$, halogen, hydroxyl, alkoxyl and the like; scandium carboxylates such as scandium formate, scandium acetate, scandium propionate, scandium 2-ethylhexanoate, scandium benzoate, scandium benzoates in which one or more of the benzoate groups is ring-substituted with one or more of alkyl, $CF_3$, cyano, $COCH_3$, halogen, hydroxyl, alkoxyl and the like; scandium salicylate; scandium acetylacetonate and scandium t-butylacetylacetonate.

Examples of useful molybdenum compounds include Mo(IV) and/or Mo(VI) compounds such as molybdenum phosphate; molybdenum pyrophosphate, molybdenum oxide; molybdenum alkoxides such as molybdenum methoxide, molybdenum ethoxide, molybdenum isopropoxide, molybdenum t-butoxide, molybdenum sec-butoxide and the like; molybdenum aryloxides such as molybdenum phenoxide and molybdenum phenoxides in which one or more of the phenoxide groups is ring-substituted with one or more of alkyl, $CF_3$, cyano, $COCH_3$, halogen, hydroxyl, alkoxyl and the like; molybdenum carboxylates such as molybdenum formate, molybdenum acetate, molybdenum propionate, molybdenum 2-ethylhexanoate, molybdenum benzoate, molybdenum benzoates in which one or more of the benzoate groups is ring-substituted with one or more of alkyl, $CF_3$, cyano, $COCH_3$, halogen, hydroxyl, alkoxyl and the like, molybdenum salicylate, molybdenum 3,5-di-t-butyl salicylate; molybdenum acetylacetonate.

Examples of useful cobalt compounds include Co (II) and/or Co(III) compounds such as cobalt phosphate; cobalt pyrophosphate, cobalt oxide; cobalt alkoxides such as cobalt methoxide, cobalt ethoxide, cobalt isopropoxide, cobalt t-butoxide, cobalt sec-butoxide and the like; cobalt aryloxides such as cobalt phenoxide and cobalt phenoxides in which one or more of the phenoxide groups is ring-substituted with one or more of alkyl, $CF_3$, cyano, $COCH_3$, halogen, hydroxyl, alkoxyl and the like; cobalt carboxylates such as cobalt formate, cobalt acetate, cobalt propionate, cobalt 2-ethylhexanoate, cobalt benzoate, cobalt benzoates in which one or more of the benzoate groups is ring-substituted with one or more of alkyl, $CF_3$, cyano, $COCH_3$, halogen, hydroxyl, alkoxyl and the like, cobalt salicylate, cobalt 3,5-di-t-butyl salicylate; cobalt acetylacetonate; and cobalt t-butylacetylacetonate, in each case being a Co(II) and/or Co(III) compound.

Examples of useful tungsten compounds include tungsten phosphate; tungsten pyrophosphate, tungsten oxide; tungsten alkoxides such as tungsten methoxide, tungsten ethoxide, tungsten isopropoxide, tungsten t-butoxide, tungsten sec-butoxide and the like; tungsten aryloxides such as tungsten phenoxide and tungsten phenoxides in which one or more of the phenoxide groups is ring-substituted with one or more of alkyl, $CF_3$, cyano, $COCH_3$, halogen, hydroxyl, alkoxyl and the like; tungsten carboxylates such as tungsten formate, tungsten acetate, tungsten propionate, tungsten 2-ethylhexanoate, tungsten benzoate, tungsten benzoates in which one or more of the benzoate groups is ring-substituted with one or more of alkyl, $CF_3$, cyano, $COCH_3$, halogen, hydroxyl, alkoxyl and the like, tungsten salicylate, tungsten 3,5-di-t-butyl salicylate; tungsten acetylacetonate; and tungsten t-butylacetylacetonate.

Examples of useful iron compounds include iron (II) and/or iron (III) compounds such as iron phosphate; iron pyrophosphate, iron oxide; iron alkoxides such as iron methoxide, iron ethoxide, iron isopropoxide, iron t-butoxide, iron sec-butoxide and the like; iron aryloxides such as iron phenoxide and iron phenoxides in which one or more of the phenoxide groups is ring-substituted with one or more of alkyl, $CF_3$, cyano, $COCH_3$, halogen, hydroxyl, alkoxyl and the like; iron carboxylates such as iron formate, iron acetate, iron propionate, iron 2-ethylhexanoate, iron benzoate, iron benzoates in which one or more of the benzoate groups is ring-substituted with one or more of alkyl, $CF_3$, cyano, $COCH_3$, halogen, hydroxyl, alkoxyl and the like, iron salicylate, iron 3,5-di-t-butyl salicylate; iron acetylacetonate; and iron t-butylacetylacetonate, in each case being a Fe(II) and/or Fe(III) compound.

Examples of useful vanadium compounds include vanadium alkoxides such as vanadium methoxide, vanadium ethoxide, vanadium isopropoxide, vanadium t-butoxide, vanadium sec-butoxide and the like; vanadium oxide; vanadium oxo tris(alkoxides) such as vanadium oxo tris(methoxide), vanadium oxo tris(ethoxide), vanadium oxo tris(isopropoxide), vanadium oxo tris(t-butoxide), vanadium oxo tris(sec-butoxide) and the like; vanadium aryloxides such as vanadium phenoxide and vanadium phenoxides in which one or more of the phenoxide groups is ring-substituted with one or more of alkyl, $CF_3$, cyano, $COCH_3$, halogen, hydroxyl, alkoxyl and the like; vanadium carboxylates such as vanadium formate, vanadium acetate, vanadium propionate, vanadium 2-ethylhexanoate, vanadium benzoate, vanadium benzoates in which one or more of the benzoate groups is ring-substituted with one or more of alkyl, $CF_3$, cyano, $COCH_3$, halogen, hydroxyl, alkoxyl and the like, vanadium salicylate, vanadium 3,5-di-t-butyl salicylate; vanadium tris(acetylacetonate) and vanadium tris(t-butylacetylacetonate); vanadium oxo bis(acetylacetonate).

Examples of useful tin compounds include stannous phosphate; stannous pyrophosphate, stannous oxide; stannic oxide; stannous alkoxides such as stannous methoxide, stannous ethoxide, stannous isopropoxide, stannous t-butoxide, stannous sec-butoxide and the like; stannous aryloxides such as stannous phenoxide and stannous phenoxides in which one or more of the phenoxide groups is ring-substituted with one or more of alkyl, $CF_3$, cyano, $COCH_3$, halogen, hydroxyl, alkoxyl and the like; stannous carboxylates such as stannous formate, stannous acetate, stannous propionate, stannous 2-ethylhexanoate, stannous benzoate, stannous benzoates in which one or more of the benzoate groups is ring-substituted with one or more of alkyl, $CF_3$, cyano, $COCH_3$, halogen, hydroxyl, alkoxyl and the like, stannous salicylate, stannous 3,5-di-t-butyl salicylate; stannous acetylacetonate; and stannous t-butylacetylacetonate.

Examples of useful zinc compounds include zinc alkyls such as such as dimethyl zinc, diethyl zinc, dibutyl zinc, dibenzyl zinc and the like; zinc oxide; alkyl zinc alkoxides such as ethyl zinc isopropoxide; zinc alkoxides such as zinc methoxide, zinc ethoxide, zinc isopropoxide, zinc t-butoxide, zinc sec-butoxide and the like; zinc aryloxides such as zinc phenoxide and zinc phenoxides in which one or more of the phenoxide groups is ring-substituted with one or more of alkyl, $CF_3$, cyano, $COCH_3$, halogen, hydroxyl, alkoxyl and the like; zinc carboxylates such as zinc formate, zinc acetate, zinc propionate, zinc 2-ethylhexanoate, zinc benzoate, zinc benzoates in which one or more of the benzoate groups is ring-substituted with one or more of alkyl, $CF_3$, cyano, $COCH_3$, halogen, hydroxyl, alkoxyl and the like, zinc salicylate, zinc 3,5-di-t-butyl salicylate; zinc amides such as zinc dimethylamide, zinc diethylamide, zinc diphenylamide, zinc (bistrimethylsilyl)amide; zinc acetylacetonate and zinc t-butylacetylacetonate.

Examples of useful titanium compounds include titanium dioxide and titanium alkoxides having the structure $Ti(OR)_4$ wherein R is alkyl or phenyl (which may be substituted), such as titanium tetraethoxide, titanium tetraisopropoxide, titanium tetra-t-butoxide, titanium tetra-sec-butoxide, titanium tetraphenoxide, titanium tetraphenoxides in which one or more of the phenoxide groups are independently ring-substituted with one or more of alkyl, $CF_3$, cyano, $COCH_3$, halogen, hydroxyl, alkoxyl and the like.

Examples of useful silicon compounds include silica and silicon alkoxides having the structure $Si(OR)_4$ wherein R is alkyl or phenyl (which may be substituted), such as silicon dioxide, silicon tetraethoxide, silicon tetraisopropoxide, silicon tetra-t-butoxide, silicon tetra-sec-butoxide, silicon tetraphenoxide, silicon tetraphenoxides in which one or more of the phenoxide groups are independently ring-substituted with one or more of alkyl, $CF_3$, cyano, $COCH_3$, halogen, hydroxyl, alkoxyl and the like.

In certain embodiments, the catalyst complex comprises a physical admixture of particles of a water-insoluble zinc hexacyanocobaltate with particles of an $M^5$ metal oxide and particles of an $M^6$ metal or semi-metal oxide (or particles of both $M^5$ metal and $M^6$ metal or semi-metal oxides). Such physical admixtures can be made by a precipitation process as described before, or by forming a double metal cyanide catalyst separately and then combining it with particles of the $M^5$ metal and $M^6$ metal or semi-metal oxide.

The $M^5$ metal oxide is present in an amount that provides at least 0.001 or at least 0.0025 moles of $M^5$ metal per mole of cobalt provided by the zinc hexacyanocobaltate catalyst. The amount of $M^5$ metal oxide may be up to 10, up to 5, up to 1.5, up to 0.25 or up to 0.125 moles of $M^5$ metal per mole of cobalt provided by the zinc hexacyanocobaltate catalyst. In some embodiments the $M^6$ metal oxide is present in an amount that provides at least 0.002, at least 0.01, at least 0.025 or at least 0.05 moles of $M^6$ metal or semi-metal per mole of cobalt provided by the zinc hexacyanocobaltate catalyst. The amount of $M^6$ metal or semi-metal oxide may be up to 10, up to 2 up to 1.25 or up to 0.5 moles of $M^6$ metal or semi-metal per mole of cobalt provided by the zinc hexacyanocobaltate catalyst. The mole ratio of $M^5$ metal to $M^6$ metal or semi-metal may be at least 0.025 or at least 0.05 and up to 1.5, up to 1 or up to 0.5. Smaller amounts of the $M^5$ and $M^6$ oxides do not lead to any improvement in the performance of the catalyst complex. Larger amounts of the $M^5$ and $M^6$ oxides not only fail to improve the catalyst performance but actually tend to diminish it.

The $M^5$ metal oxide and $M^6$ metal or semi-metal oxide particles may have a surface area of at least 1 $m^2/g$ as measured using gas sorption methods. The surface area of the $M^5$ metal oxide and/or $M^6$ metal or semi-metal oxide particles may be at least 10 $m^2/g$ or at least 100 $m^2/g$, and may be up to, for example, 300 $m^3/g$ or more. Their volume average particle size may be 100 μm or smaller, 25 μm or smaller, 1 μm or smaller or 500 nm or smaller. Such physical admixtures can be made by, for example, forming solid particles of the zinc hexacyanocobaltate and combining them with the $M^5$ metal oxide and $M^6$ metal or semi-metal oxide particles. This can be done at any stage of the zinc hexacyanocobaltate preparation process after the zinc hexacyanocobaltate has precipitated. For example, it is common to wash a precipitated zinc hexacyanocobaltate with water and/or a ligand one or more times before final drying. The $M^5$ metal oxide and $M^6$ metal or semi-metal oxides can be combined with the zinc hexacyanocobaltate during any such washing step.

Polyethers are prepared according to the invention in a process that comprises: (1) combining a catalyst complex of the invention with an alcoholic starter compound and an alkylene oxide to form a polymerization mixture, and then subjecting the polymerization mixture to polymerization conditions.

The polymerization in some embodiments is performed in the presence of no more than 0.01 mole of a carbonate precursor per mole of alkylene oxide that is polymerized. A "carbonate" precursor is a compound that gives rise to carbonate (—O—C(O)—O—) linkages when polymerized with an alkylene oxide. Examples of carbonate precursors include carbon dioxide, linear carbonates, cyclic carbonates, phosgene and the like. The polymerization in some embodiments is performed in the presence of no more than 0.001 moles of a carbonate precursor or no more than 0.0001 moles of a carbonate precursor, per mole of alkylene oxide that is polymerized. The carbonate precursor may be absent entirely. Accordingly, the polyether formed in such embodiments of the process has few if any carbonate linkages. The polyether formed in such embodiments of the process may have up to 0.5 weight-% $CO_2$ in the form of carbonate linkages. It may contain no more than 0.1 weight-% of such $CO_2$ and may contain no more than 0.01 weight-% of such $CO_2$. It may contain no such $CO_2$.

The main functions of the starter compound are to provide molecular weight control and to establish the number of hydroxyl groups that the polyether product will have. A hydroxyl-containing starter compound may contain 1 or more (e.g., 2 or more) hydroxyl groups and as many as 12 or more hydroxyl groups. For example, starters for producing polyols for use in polyurethane applications usually have from 2 to 8 hydroxyl groups per molecule. In some embodiments, the starter compound will have from 2 to 4 or from 2 to 3 hydroxyl groups. In other embodiments, the starter compound will have from 4 to 8 or from 4 to 6 hydroxyl groups. The starter compound may have at least two hydroxyl groups that are in the 1,2- or 1,3-positions with respect to each other (taking the carbon atom to which one of the hydroxyl groups is bonded as the "1" position). Mixtures of starter compounds can be used.

The starter compound will have a hydroxyl equivalent weight less than that of the monol or polyol product. It may have a hydroxyl equivalent weight of from 30 to 500 or more. The equivalent weight may be up to 500, up to 250, up to 125, and/or up to 100.

Exemplary starters include, but are not limited to, ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, phenol and polyphenolic starters such as bisphenol A or 1,1,1-tris(hydroxyphenyl)ethane, and alkoxylates (such as ethoxylates and/or propoxylates) of any of these that have a hydroxyl equivalent weight less than that of the product of the polymerization. The starter compound can also be water. The starter may be neutralized with or contain a small amount of an acid, particularly if the starter is prepared in the presence of a base (as is often the case with glycerin). If an acid is present, it may be present in an amount of from about 10 to 100 ppm, based on the weight of the starter, e.g., as described in U.S. Pat. No. 6,077,978. The acid may be used in somewhat larger amounts, such as from 100 to 1000 ppm, based on the weight of the starter, as described in U.S. Patent Publication Application No. 2005-0209438. The acid may be added to the starter before or after the starter is combined with the catalyst complex.

The alkylene oxide may be, e.g., ethylene oxide, 1,2-propylene oxide, 2,3-propylene oxide, 1,2-butane oxide, 2-methyl-1,2-butaneoxide, 2,3-butane oxide, tetrahydrofuran, epichlorohydrin, hexane oxide, styrene oxide, cyclohexene oxide, divinylbenzene dioxide, a glycidyl ether such as Bisphenol A diglycidyl ether, allyl glycidyl ether, or other polymerizable oxirane. The preferred alkylene oxide is 1,2-propylene oxide, or a mixture of at least 40% (preferably at least 80%) by weight propylene oxide and up to 60% by weight (preferably up to 20%) ethylene oxide.

The polymerization typically is performed at an elevated temperature. The polymerization mixture temperature may be, for example, 70° C. to 220° C. (e.g., from 120° C. to 190° C.).

The polymerization reaction usually may be performed at superatmospheric pressures, but can be performed at atmospheric pressure or even sub-atmospheric pressures. A preferred pressure is 0 to 10 atmospheres, especially 0 to 6 atmospheres, gauge pressure.

The polymerization preferably is performed under vacuum or under an inert atmosphere such as a nitrogen, helium or argon atmosphere. Carbon dioxide is either absent or present in at most an amount as indicated above with regard to carbonate precursors.

Enough of the catalyst complex may be used to provide a reasonable polymerization rate, but it is generally desirable to use as little of the catalyst complex as possible consistent with reasonable polymerization rates, as this both reduces the cost for the catalyst and, if the catalyst levels are low enough, can eliminate the need to remove catalyst residues from the product. Using lower amounts of catalysts also reduces the residual metal content of the product. The amount of catalyst complex may be from 1 to 5000 ppm based on the weight of the product. The amount of catalyst complex may be at least 2 ppm, at least 5 ppm, at least 10 ppm, at least 25 ppm, or up to 500 ppm or up to 200 ppm or up to 100 ppm, based on the weight of the product. The amount of catalyst complex may be selected to provide 0.25 to 20, 0.5 to 10, 0.5 to 1 or 0.5 to 2.5 parts by weight cobalt per million parts by weight of the product.

The polymerization reaction may be performed in any type of vessel that is suitable for the pressures and temperatures encountered. In a continuous or semi-batch process, the vessel should have one or more inlets through which the alkylene oxide and additional starter compound and catalyst complex can be introduced during the reaction. In a continuous process, the reactor vessel should contain at least one outlet through which a portion of the partially polymerized reaction mixture can be withdrawn. In a semi-batch operation, alkylene oxide (and optionally additional starter and catalyst complex) is added during the reaction, but product usually is not removed until the polymerization is completed. A tubular reactor that has multiple points for injecting the starting materials, a loop reactor, and a continuous stirred tank reactor (CTSR) are all suitable types of vessels for continuous or semi-batch operations. The reactor should be equipped with a means of providing or removing heat so the temperature of the reaction mixture can be maintained within the required range. Suitable means include various types of jacketing for thermal fluids, various types of internal or external heaters, and the like. A cook-down step performed on continuously withdrawn product is conveniently conducted in a reactor that prevents significant back-mixing from occurring. Plug flow operation in a pipe or tubular reactor is a preferred manner of performing such a cook-down step.

The product obtained in any of the foregoing processes may contain up to 0.5% by weight, based on the total weight, of unreacted alkylene oxide; small quantities of the starter compound and low molecular weight alkoxylates thereof, and small quantities of other organic impurities and water. Volatile impurities should be flashed or stripped from the resultant monol or polyol. The product typically contains catalyst residues. It is typical to leave these residues in the product, but these can be removed if desired. Moisture and volatiles can be removed by stripping the polyol.

The polymerization reaction can be characterized by the "build ratio", which is defined as the ratio of the number average molecular weight of the product to that of the starter compound. This build ratio may be as high as 160, but is more commonly in the range of from 2.5 to about 65 and still more commonly in the range of from 2.5 to about 50, from 2.5 to 35, from 2.5 to 11 or from 7 to 11.

The invention is particularly useful in polymerization processes characterized by one or more of the following: i) the use of a starter having an equivalent weight of up to 125, especially up to 100 or up to 75; ii) a hydroxyl content of 4.25 to 20 wt. %, especially 4.25 to 15 wt. %, based on the total weight of the reaction mixture, during at least a portion of the polymerization process, and iii) a concentration of catalyst complex sufficient to provide at most 5 ppm of cobalt, especially 0.5 to 2 ppm, based on the weight of the product. Each of these represents a severe condition in which conventional zinc hexacyanocobaltate catalysts perform poorly.

Polyethers made in accordance with the invention may include monoalcohols such as are useful for surfactant and industrial solvent or lubricant applications, and polyols such as are useful raw materials for producing polymers such as polyurethanes such as molded foams, slabstock foams, high resiliency foams, viscoelastic foams, rigid foams, adhesives, sealants, coatings, elastomers, composites, etc.

The following examples are provided to illustrate exemplary embodiments and are not intended to limit the scope thereof. All parts and percentages are by weight unless otherwise indicated.

EXAMPLE 1 AND COMPARATIVE SAMPLES A AND B

To make Example 1: 2.07 g of gallium tri(isopropoxide) and 20 mL of anhydrous t-butanol are heated at 40° C. under nitrogen for an hour. 20 mL of water are added. 2.07 g of aluminum tri(s-butoxide) are added. Zinc chloride (8.00 grams) is then added and the mixture stirred for 30 minutes at 40° C. Next, a solution of potassium hexacyanocobaltate (1.728 grams) premixed with water (40 mL) is added dropwise over a period of 2.5 hours. The mixture in the flask then is heated under reflux until a white gel forms after a period of approximately 20 hours. The resultant gel is dispersed in water (60 mL) and tert-butyl alcohol (60 mL) and centrifuged (5000 rpm) for a period of 15 minutes. The solvent is decanted and the resultant material is again dispersed in a mixture of water (60 mL) and tert-butyl alcohol (60 mL). The resultant dispersion is heated to 55° C. for 35 minutes and then centrifuged (5000 rpm) for a period of 15 minutes. The resultant material is then washed four times with 50/50 by volume mixture of distilled water and tert-butyl alcohol and once more using tert-butyl alcohol (120 mL). The washed material is dried under vacuum at 60° C. overnight to a constant pressure (<10 mbar). The resultant dried solid is milled, forming a catalyst sample in the form of a finely divided powder.

Comparative Sample A is made in the same manner, except the gallium tri(isopropoxide) is omitted and the amount of aluminum tri(s-butoxide) is doubled.

Comparative Sample B is made in the same manner, except the aluminum tri(s-butoxide) is omitted and the amount of gallium tri(isopropoxide) is doubled.

The metals and chlorine analysis of each of these catalysts is determined using XRF methods, with results as follows:

| Sample | Moles per mole Cobalt | | | | |
|---|---|---|---|---|---|
| | Co | Zn | Ga | Al | Cl |
| Ex. 1 | 1 | 1.8 | 1.25 | 1.1 | 0.7 |
| A | 1 | 2.2 | 0 | 2.3 | 0.75 |
| B | 1 | 2.0 | 4.7 | 0 | 0.7 |

Catalyst Example 1 and Comparative Samples A and B are used to produce polyether polyols in a semi-batch process. Dipropylene glycol (475.4 g) and 142.0 milligrams of the catalyst sample (enough to provide 100 parts per million based on the expected mass of the product) are added a 7 L Juchheim reactor at 60° C. and stirred at 50 rpm under dry nitrogen. The reactor is closed and set to 100° C. and 400 rpm. Then, the atmosphere within the reactor is purged with dry nitrogen and vacuum is applied. This part of the procedure is repeated four additional times. The reactor is isolated and placed under vacuum for one hour at 160° C. to dry the starting materials. 140 g of propylene oxide are then added to the reactor at the same temperature. This raises the internal reactor pressure to about 3 bar gauge (304 kPa) (all pressures reported herein are gauge pressures unless noted otherwise). The pressure inside the reactor is continuously monitored for a pressure drop that indicates catalyst activation has taken place. The time required for the reactor pressure to drop to 1 bar (101 kPa) is noted as the activation time. 40 minutes after the start of the process (or upon catalyst activation in cases in which the catalyst has not yet activated after 40 minutes), 868.8 g of propylene oxide is fed to the reaction at 160° C. The feed rate is increased linearly from zero to 29 g/min over the course of one hour unless the internal pressure during the feed reaches 4 bar (405 kPa), in which case the feed rate is discontinued until the pressure drops to 3.5 bar (354 kPa), at which point the feed is resumed. Therefore, the shortest possible time for the propylene oxide addition is 60 minutes, which can be obtained only if the reactor pressure does not reach the pressure limit during the propylene oxide feed. After the propylene oxide is completed, the reaction mixture is digested for 15 minutes at 160° C. Vacuum is then is applied to remove any unreacted propylene oxide. The reactor is then cooled to 100° C. and 200 ppm of an antioxidant is added to the reaction mixture under dry nitrogen. Then, the product is cooled to ambient temperature and collected. Batch size is approximately 1421.8 grams in each case. The product molecular weight is 400 g/mol. During the polymerization, the hydroxyl content of the reaction mixture decreases from about 20% by weight to about 4.25% by weight.

The internal reactor pressure is monitored during the reaction as in indication of the activity of the catalyst. These polymerization conditions represent a difficult challenge for conventional double metal cyanide catalysts because of the low molecular weight of the starter (dipropylene glycol). Conventional DMC catalysts perform poorly in the presence of high concentrations of hydroxyl groups, which is the case during early stages of a semi-batch process such as this in which the starter molecular weight is low. It is for this reason that the propylene oxide feed rate is ramped up gradually after catalyst activation. The catalyst activity and therefore polymerization rate is expected to increase as the product builds molecular weight, which allows the propylene oxide to be consumed more rapidly and therefore be fed more rapidly.

FIG. 1 shows the corresponding pressure vs. time plots for Example 1 (line 1) and Comparative Samples A and B (lines A and B, respectively). Each of lines 1, A and B illustrates a similar general trend of pressure vs. time. Thus, each of lines 1, A and B include a Segment 2 which represents the increase in reactor pressure during the initial propylene oxide feed in each case. The pressure increases to about 3 bar (303 kPa). The following slow decrease in reactor pressure indicated in Segment 3 of lines 1, A and B indicates the consumption of propylene oxide as the catalyst activates. The time at which the pressure decreases to 1 bar (101 kPa)

is taken as the catalyst activation time. This time is less than 20 minutes for each of Example 1 and Comparative Sample A and 25-30 minutes for Comparative Sample 1. Segment 4 of lines 1, A and B indicates the increase in pressure as the subsequent propylene oxide feed is commenced. As shown in the FIGURE, the reactor pressure in each case reaches a maximum (5,5A and 5B) after which reactor pressure falls substantially despite the rapid feed rate, as indicated by segment 6 of lines 1, A and B. At this point of the reaction, propylene oxide is being consumed at rates greater than 30 g/minute. The entire amount of propylene oxide fed (868.6 grams) is consumed in each case 100-105 minutes after the start of the process. Segment 7 of lines 1, A and B indicates the reactor pressure during the final digestion step in each case, after all propylene oxide has been fed to the reactor.

The advantage of the invention is seen by comparing the activation time and the time to onset of rapid polymerization, as well as by comparing the maximum pressure achieved once the catalyst has activated. These values are summarized in the following table:

TABLE 2

| Designation | Added Metal, Moles per mole Co[1] | Activation Time, min | Onset of Rapid Polymerization, min | Maximum Presure[2] |
|---|---|---|---|---|
| A* | Al, 2.3 | 25-30 | 71 | 3.87 psi |
| B* | Ga, 4.7 | 10-15 | 59 | 1.71 psi |
| 1 | Ga, 1.25, Al, 1.1 | 10-15 | 65 | 1.69 psi |

*Not an example of the invention.
[1]The additional metal (aluminum and/or gallium) added into the catalyst precipitation step, and moles of that metal per mole of cobalt in the product as determined by XRF.
[2]The maximum pressure obtained in the reactor after the catalyst has activated and the 29 g/minute propylene oxide feed is started.

Comparative Sample B is a gallium-containing hybrid catalyst. It performs very well compared even to the aluminum-containing catalyst (Comparative Sample A, which itself performs very well on this stringent test). However the proportion of gallium is high in that catalyst; gallium being expensive it is desirable to obtain equivalent performance while reducing the amount of gallium. Example 1 achieves this goal; the amount of gallium is reduced by about three-quarters relative to Comparative Sample A, yet the performance is quite similar. Although the aluminum-containing catalyst performs less well, it is seen that by using a combination of aluminum and gallium in the catalyst one can mimic the performance of the gallium-containing catalyst (Comp. Sample B) while vastly reducing the amount of expensive gallium.

EXAMPLES 2-14 AND COMPARATIVE SAMPLES B AND C

Hybrid catalysts containing silicon as the $M^6$ semi-metal and gallium, hafnium, indium or titanium as the $M^5$ metal are made in the following general manner: The $M^5$ metal compound (as identified in Table 3 below) and tetrapropyl orthosilicate are weighed into a vial, to yield molar proportions of silicone to $M^5$ metal as indicated in Table 3. t-butanol (10 moles per combined moles of silicon and $M^5$ metal) and 0.01M HCl solution (0.05 moles per combined moles of silicon and $M^5$ metal) and water (equal to the t-butanol volume minus the HCl solution volume) are added and the mixture is heated at 60° C. for 30 minutes with mixing. The mixture is cooled to 30° C. t-Butanol and water are added at a 1:6 volume ratio, followed by $K_3Co(CN)_6$, which is allowed to dissolve. The amount of $K_3Co(CN)_6$ is sufficient to provide silicon to cobalt mole ratio as indicated in Table 3. A 50% solution of zinc chloride in water is added, followed by a small amount of a 4000 molecular weight poly(propylene oxide) diol. The resulting reaction solution is mixed at room temperature for at least one hour.

The precipitate is recovered by centrifuging and decanting the liquid phase. It is then washed successively with mixtures of t-butanol, water and the 4000 molecular weight poly(propylene oxide) diol, in each case followed by centrifuging and decanting the liquid phase. The solids are then dried at 60° C. overnight under vacuum, followed by breaking up larger agglomerates, to form a powdered catalyst complex.

A sample of the catalyst complex is analyzed by X-ray fluorescense for Co, Si and the $M^5$ metal. Molar ratios of these metals as measured are as indicated in Table 3.

Comparative Samples B and C are made without the silicone and $M^5$ metal (Comp. B) or with silicone but without an $M^5$ metal (Comp. C).

Alkylene oxide polymerizations and/or propylene oxide/carbon dioxide copolymerizations are performed on using a 48-well Symyx Technologies Parallel Pressure Reactor (PPR). Each of the 48 wells is equipped with an individually weighed glass insert having an internal working liquid volume of approximately 5 mL. The wells each contain an overhead paddle stirrer.

720.65 milligrams of a 700 molecular weight poly(propylene oxide) starter and 0.35 milligrams of the catalyst complex are charged to each insert. Each well is pressurized with 50 psig (344.7 kPa) of nitrogen and then heated to the polymerization temperature. Upon reaching the polymerization temperature 1 mL of the epoxide is injected into each well, where it reacts with the starter in the glass insert.

The internal pressure in the headspace of each well is monitored individually throughout the polymerization. Each hour after the first injection of epoxide, the internal pressure is observed, and if the pressure in any particular well has fallen below 190 psig (1.31 MPa), another 1 mL of the alkylene oxide is injected. This is repeated up to three times throughout the entire length of the run, which is 4 hours. 4 hours after the first epoxide injection, the wells are allowed to cool to room temperature and vented. The glass inserts are allowed to stand under nitrogen over night to allow residual epoxide to volatilize, after which the inserts are weighed to determine the amount of product as an indication of the relative activity of the catalyst complex. Results are as indicated in Table 3.

TABLE 3

| | | Mole Ratios (Recipe) | | | Mole Ratios (XRF) | | | |
|---|---|---|---|---|---|---|---|---|
| Sample | $M^5$ Metal Compound | Si:Co | $M^5$ metal:Si | $M^5$:Co | Si:Co | $M^5$ metal:Si | $M^5$:Co | Product Yield, g |
| B* | None | 0 | 0 | 0 | 0 | 0 | 0 | 1.33 |
| C* | None | 0.2 | 0 | 0 | 0.18 | 0 | 0 | 1.19 |
| 2 | Ga Isopropoxide | 0.2 | 0.05 | 0.01 | 0.15 | 0.1 | 0.015 | 2.54 |

TABLE 3-continued

| Sample | M⁵ Metal Compound | Mole Ratios (Recipe) | | | Mole Ratios (XRF) | | | Product Yield, g |
| --- | --- | --- | --- | --- | --- | --- | --- | --- |
| | | Si:Co | M⁵ metal:Si | M⁵:Co | Si:Co | M⁵ metal:Si | M⁵:Co | |
| 3 | Ga Isopropoxide | 0.2 | 0.275 | 0.055 | 0.15 | 0.37 | 0.056 | 2.57 |
| 4 | Ga Isopropoxide | 0.2 | 0.5 | 0.1 | 0.13 | 0.87 | 0.11 | 2.04 |
| 5 | Hf Isopropoxide | 0.2 | 0.05 | 0.01 | 0.12 | 0.06 | 0.007 | 2.46 |
| 6 | Hf Isopropoxide | 0.2 | 0.275 | 0.055 | 0.15 | 0.32 | 0.05 | 2.59 |
| 7 | Hf Isopropoxide | 0.2 | 0.5 | 0.01 | 0.11 | 0.66 | 0.075 | 1.87 |
| 8 | In Isopropoxide | 0.2 | 0.05 | 0.01 | 0.10 | 0.126 | 0.012 | 2.16 |
| 9 | In Isopropoxide | 0.2 | 0.275 | 0.055 | 0.10 | 0.74 | 0.074 | 2.02 |
| 10 | In Isopropoxide | 0.2 | 0.5 | 0.1 | 0.1 | 1.35 | 0.13 | 2.06 |
| 11 | Ti Butoxide | 0.2 | 0.05 | 0.01 | 0.2 | 0.065 | 0.013 | 1.28 |
| 12 | Ti Butoxide | 0.2 | 0.275 | 0.055 | 0.18 | 0.315 | 0.058 | 3.03 |
| 13 | Ti Butoxide | 0.2 | 0.5 | 0.1 | 0.15 | 0.46 | 0.07 | 3.07 |
| 14 | Ti Butoxide | 0.05 | 0.5 | 0.025 | 0.02 | 0.94 | 0.022 | 1.76 |

*Not an example of the invention.

EXAMPLES 15-18 AND COMPARATIVE SAMPLE D

Catalyst complexes are made and evaluated in the same general manner as Examples 2-14. Aluminum is the $M^6$ metal (supplied in the form of aluminum tri-butoxide). The $M^5$ metal compound is titanium tetra(butoxide) or indium isopropoxide. Amounts of the aluminum and $M^5$ metal are as indicated in Table 4, as are the yields of product in each case. No titanium is present in the comparative samples.

TABLE 4

| Sample | M⁵ Metal Compound | Mole Ratios (Recipe) | | | Mole Ratios (XRF) | | | Yield, g |
| --- | --- | --- | --- | --- | --- | --- | --- | --- |
| | | Al:Co | M⁵:Al | M⁵:Co | Al:Co | M⁵:Al | M⁵:Co | |
| D* | None | 0.05 | 0 | 0 | 0.03 | 0 | 0 | 1.28 |
| 15 | Ti butoxide | 0.05 | 0.05 | 0.0025 | 0.01 | 0.22 | 0.0022 | 2.56 |
| 16 | Ti butoxide | 0.05 | 0.275 | 0.0413 | 0.02 | 0.36 | 0.0072 | 2.53 |
| 17 | Ti butoxide | 0.05 | 0.5 | 0.025 | 0.03 | 1.00 | 0.03 | 3.10 |
| 18 | In isopropoxide | 0.2 | 0.5 | 0.1 | 0.06 | 2.03 | 0.1218 | 2.91 |

EXAMPLES 19-25

Catalyst complexes are made and evaluated in the same general manner as Examples 2-14. Titanium is the $M^6$ metal (supplied in the form of tetra(butoxide)). The $M^5$ metal compound is as indicated in Table 5. Amounts of the titanium and $M^5$ metal are as indicated in Table 5, as are the yields of product in each case.

TABLE 5

| Sample | M⁵ Metal Compound | Mole Ratios (Recipe) | | | Mole Ratios (XRF) | | | Yield, g |
| --- | --- | --- | --- | --- | --- | --- | --- | --- |
| | | Ti:Co | M⁵:Ti | M⁵:Co | Ti:Co | M⁵:Ti | M⁵:Co | |
| 19 | In isopropoxide | 0.2 | 0.05 | 0.01 | 0.18 | 0.23 | 0.043 | 2.87 |
| 20 | In isopropoxide | 0.2 | 0.275 | 0.055 | 0.17 | 0.5 | 0.08 | 3.06 |
| 21 | In isopropoxide | 0.2 | 0.5 | 0.1 | 0.19 | 0.48 | 0.09 | 2.63 |
| 22 | Ga isopropoxide | 0.2 | 0.05 | 0.01 | 0.18 | 0.10 | 0.018 | 3.14 |
| 23 | Ga isopropoxide | 0.2 | 0.5 | 0.1 | 0.18 | 0.55 | 0.096 | 3.06 |
| 24 | Mn (III) oxide | 0.2 | 0.275 | 0.055 | 0.18 | 0.63 | 0.11 | 3.10 |
| 25 | Mn (III) oxide | 0.2 | 0.5 | 0.1 | 0.20 | 0.66 | 0.13 | 2.87 |

The invention claimed is:

1. A catalyst complex selected from the group consisting of catalyst complexes I and II, wherein:
catalyst complex I is corresponds to the formula:

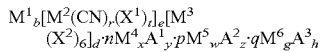

wherein:
$M^1$ and $M^4$ each represent a metal ion independently selected from $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$;
$M^2$ and $M^3$ each represent a metal ion independently selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$;
$M^5$ represents one or more of gallium, hafnium, manganese, titanium and indium;

$M^6$ represents one or more of aluminum, magnesium, manganese, scandium, molybdenum, cobalt, tungsten, iron, vanadium, tin, titanium, silicon and zinc and is different from $M^5$;

$X^1$ represents a group other than cyanide that coordinates with the $M^2$ ion;

$X^2$ represents a group other than cyanide that coordinates with the $M^3$ ion;

$A^1$ represents a halide, nitrate, sulfate, carbonate, cyanide, oxalate, thiocyanate, isocyanate, perchlorate, isothiocyanate, an alkanesulfonate, an arylenesulfonate, trifluoromethanesulfonate, or a $C_{1-4}$ carboxylate;

$A^2$ and $A^3$ each represents least one alkoxide, aryloxy, carboxylate, acyl, pyrophosphate, phosphate, thiophosphate, amide, oxide, siloxide, hydride, carbamate, halide or hydrocarbon anion;

b, c and d are each numbers that reflect an electrostatically neutral complex, provided that b and c each are greater than zero;

x and y are integers that balance the charges in the metal salt $M^4_x A^1_y$;

r is an integer from 4 to 6;

t is an integer from 0 to 2;

n is a number from 0 and 20;

p is a number from 0.001 to 10;

q is a number from 0.002 to 10;

p÷q=0.025 to 1.5;

w and z are numbers that balance the charges in the metal salt $M^5_w A^2_z$, provided that w is from 1 to 4; and g and h are numbers that balance the charges in the metal salt $M^6_g A^3_h$, provided that w is from 1 to 4;

and catalyst complex II is a mixture of a zinc hexacyanocobaltate catalyst, a particulate $M^5$ metal oxide wherein $M^5$ is selected from one or more of gallium, hafnium, manganese, titanium or indium and a particulate $M^6$ metal or semi-metal oxide wherein $M^6$ is selected from one or more of aluminum, magnesium, manganese, scandium, molybdenum, cobalt, tungsten, iron, vanadium, tin, titanium, silicon and zinc and is different from $M^5$, wherein the $M^5$ metal oxide is present in an amount that provides 0.001 to 10 moles of $M^5$ metal per mole of cobalt provided by the zinc hexacyanocobaltate catalyst and the $M^6$ metal or semi-metal oxide is present in an amount that provides 0.002 to 10 moles of $M^6$ metal or semi-metal per mole of cobalt provided by the zinc hexacyanocobaltate catalyst, and the mole ratio of $M^5$ metal to $M^6$ metal or semi-metal is 0.025 to 1.5.

2. The catalyst complex of claim 1 wherein $M^1$ is zinc, $M^2$ is cobalt, and $M^4$ is iron or zinc.

3. The catalyst complex of claim 2 wherein the $M^6$ metal or semi-metal is aluminum, silicon or titanium.

4. The catalyst complex of claim 2 which is catalyst complex I in which p is 0.0025 to 1.5 and q is 0.025 to 2.

5. The catalyst complex of claim 2 which is catalyst complex I in which p is 0.0025 to 0.25 and q is 0.05 to 0.5.

6. The catalyst complex of claim 2 which is catalyst complex I in which p÷q is 0.05 to 0.5.

7. The catalyst complex of claim 2 which is catalyst II in which the $M^5$ metal oxide is present in an amount that provides 0.0025 to 1.5 moles of $M^5$ metal per mole of cobalt provided by the zinc hexacyanocobaltate catalyst and the $M^6$ metal or semi-metal oxide is present in an amount that provides 0.025 to 2 moles of $M^6$ metal or semi-metal per mole of cobalt provided by the zinc hexacyanocobaltate catalyst.

8. The catalyst complex of claim 2 which is catalyst II in which the $M^5$ metal oxide is present in an amount that provides 0.0025 to 0.25 moles of $M^5$ metal per mole of cobalt provided by the zinc hexacyanocobaltate catalyst and the $M^6$ metal or semi-metal oxide is present in an amount that provides 0.05 to 0.5 moles of $M^6$ metal or semi-metal per mole of cobalt provided by the zinc hexacyanocobaltate catalyst.

9. The catalyst complex of claim 2 wherein the $M^6$ metal or semi-metal is aluminum and the $M^5$ metal is one or more of gallium and hafnium.

10. The catalyst complex of claim 2 wherein the $M^6$ metal or semi-metal is silicon and the $M^5$ metal is one or more of gallium, indium, titanium or hafnium.

11. The catalyst complex of claim 2 wherein the $M^6$ metal or semi-metal is titanium and the $M^5$ metal is one or more of indium and gallium.

12. A method for producing a polyether, the method forming a reaction mixture comprising a hydroxyl-containing starter, at least one alkylene oxide and the catalyst complex of claim 1, and polymerizing the alkylene oxide onto the hydroxyl-containing starter to produce the polyether in the presence of no more than 0.01 moles of a carbonate precursor per mole of alkylene oxide.

* * * * *